Jan. 2, 1940.                C. R. NEESON                2,185,515
RAILWAY AIR CONDITIONING SYSTEM COMPRISING DIRECT DRIVE AND ICE STORAGE
                        Filed July 15, 1939
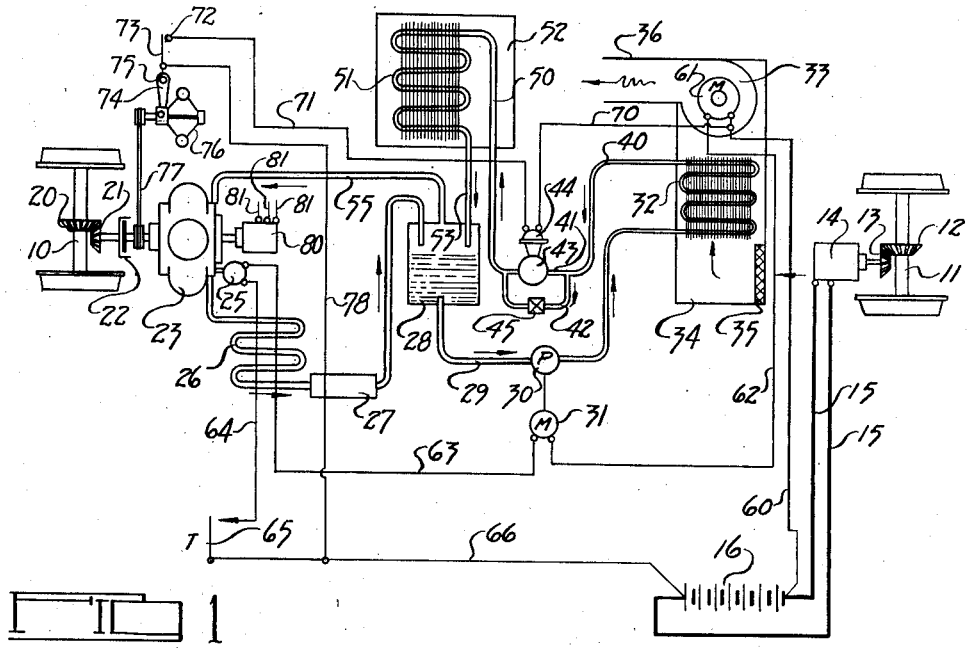
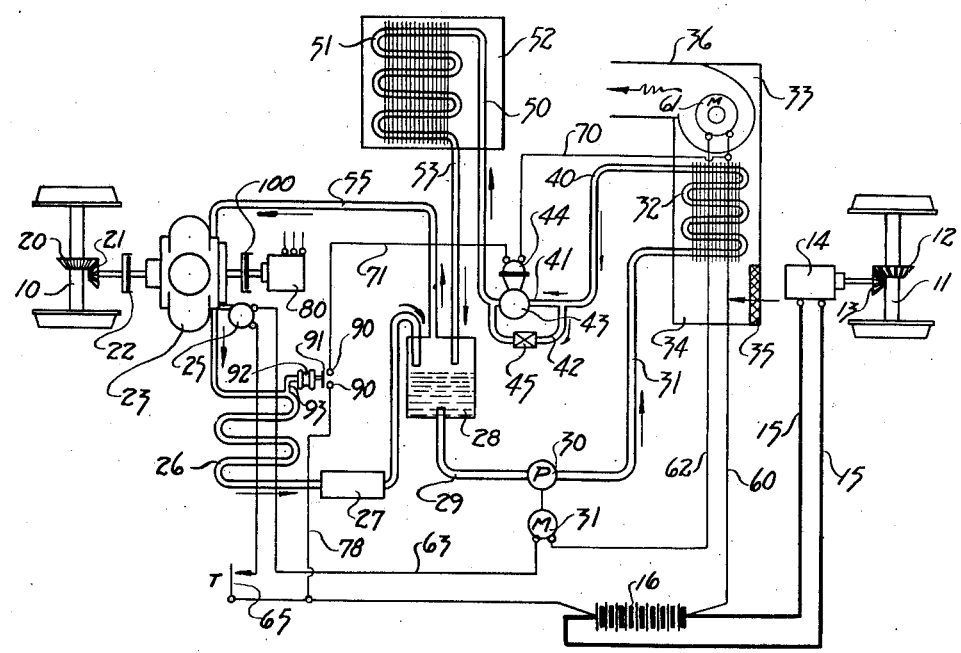
INVENTOR
CHARLES R. NEESON
BY Harness, Lind, Patee & Harris
ATTORNEY Patented Jan. 2, 1940

2,185,515

UNITED STATES PATENT OFFICE 2,185,515

RAILWAY AIR CONDITIONING SYSTEM COMPRISING DIRECT DRIVE AND ICE STORAGE

Charles R. Neeson, Dayton, Ohio, assignor, by mesne assignments, to Chrysler Corporation, Highland Park, Mich., a corporation of Delaware Application July 15, 1938, Serial No. 219,314

1 Claim. (Cl. 62—117)

My present invention relates to a means and method for air conditioning a railway passenger coach or other vehicle. It is the object of the present invention to devise a system which will be relatively inexpensive as compared to existing systems and which may be easily installed on existing coaches or passenger cars. The principal object of the present invention is to provide air conditioning means which will supplement the existing electrical equipment, rather than require the replacement of all electrical equipment by new equipment of greater capacity and complexity. According to the present invention, the existing car-lighting generator and battery may be used to operate the air conditioning controls and blowers, since it is a provision of the present invention that ice may be formed and stored for standby service instead of utilizing a large motor and battery to operate the compressor during stationary or slow-speed service. In this fashion a large portion of the electrical equipment ordinarily required for direct-drive systems or electro-mechanical systems is eliminated, and the existing electrical equipment is used to advantage in the air conditioning system. The capacity of the existing generator and battery should be sufficient for the present purpose since the existing generator and battery, in addition to providing power for the lights, is used to operate the ordinary ventilating fans and other equipment, which is the equivalent of the air conditioning blowers and related equipment used in the present invention.

A further object of the present invention is to decrease the weight and required space of modern air conditioning systems by eliminating some of the large, heavy control equipment and electrical machines, such as motors, generators and control panels, increased battery sections and other mechanical equipment heretofore found necessary in such systems. Another object is to simplify the control equipment thereby decreasing maintenance costs since each control element is a potential source of field failure. A further object of the present invention is to utilize the refrigerant supplied for air conditioning to its fullest extent, by causing the compressor to operate at a lower back pressure than ordinarily would be the case, and providing means whereby the difference in temperature of the refrigerant returning to the compressor is stored in the form of ice for standby service.

Other objects and advantages of the present invention will be apparent from a study of the following description taken in connection with the accompanying drawing wherein like numerals refer to like parts throughout. In the drawing, Fig. 1 is a schematic diagram of one form of the present invention and Fig. 2 is a schematic diagram of a second form of the present invention.

In the drawing, the numerals 10 and 11 refer to axles of a single railway car, the numeral 10 being one of the axles supporting one truck of the car, and the numeral 11 being one of the axles supporting the other truck of the car. Axle 11 is shown as provided with a gear 12 driving a gear 13 connected to the ordinary car lighting generator 14. The generator 14 supplies current through leads 15 to the ordinary car lighting battery 16, the car lights and lighting control panel being eliminated for the sake of simplicity. The axle 10 is provided with a gear 20 driving a gear 21 which is connected to one element of a centrifugal clutch 22 through which the compressor 23 is driven, as more fully shown and described in the co-pending application of Charles R. Neeson and Frank B. Conlon, Serial No. 177,695, filed December 2, 1937. Various forms of means for transmitting motion from the axle to the compressor may be used, it being sufficient that power be transmitted after the car reaches a predetermined speed, such as fourteen to twenty miles per hour, and that the compressor be automatically unclutched from the axle at slower speeds in order to eliminate the compression drag when the locomotive is picking up speed from a standing position. The compressor is preferably of the type shown in the co-pending application of Charles R. Neeson, Serial No. 177,694, filed December 2, 1937, in which a plurality of cylinders are provided, with means automatically responsive to back pressure to control the number of cylinders in operation, in order that fewer cylinders may be operated during high speeds and more cylinders during low speeds, and with a solenoid unloader valve 25 by means of which the entire operation of the compressor may be suspended even though the crankshaft and pistons continue to operate. When the refrigerant is being compressed, it is discharged from the compressor into a condenser 26 from which condensed liquid is collected in a receiver 27. The liquid then passes into an accumulator tank 28 which comprises a sealed tank having several connections for purposes which will be explained later.

The only way in which liquid may leave the accumulator tank 28 is through pipe 29 which leads into the inlet of a pump 30 driven by a motor 31. The pump 30 acts in one sense as an expansion valve of fixed orifice since the motor 31 is preferably a D. C. motor operating at a constant speed from power derived from the car lighting battery 16. The liquid which is permitted to pass through the pump impeller is discharged into the air conditioning coil 32. Air may be drawn across the coil 32 by a blower 33 housed in a cabinet 34 provided with an inlet filter 35 and connected to a discharge duct 36 such as used in usual railroad air conditioning practice. The measured quantity of liquid passing through the pump 30 is thus expanded and takes up heat from the air to cool and dehumidify the same. The expanded refrigerant passes through pipe 40 which leads to branches 41 and 42. Branch 41 is opened or closed by a valve 43 operated by a valve motor 44, and branch 42 is provided with an orifice 45, which may be in the form of a hand valve for proper adjustment, or may be a spring loaded valve of ordinary construction, or any other pressure differential producing means whereby the pressure in coil 32 may be higher than that in coil 51. The branches 41 and 42, after passing valve 43 and orifice 45, respectively, rejoin to form pipe 50 which leads the expanded refrigerant into an ice-forming coil 51 located in a tank 52 preferably suspended beneath the car. The outlet of coil 51 is connected to a pipe 53 which extends into the accumulator tank 28 and the upper end of the accumulator tank 28 is connected to suction pipe 55 by means of which gas collecting in the upper portion of the accumulator tank is returned to the compressor to be recompressed and sent through the refrigerating cycle again.

In order to operate the blower 33, pump 31, solenoid valve 44 and the compressor at the proper time there is provided a control circuit as follows: A wire 60 extends from one terminal of battery 16 to the blower motor 61, the opposite terminal of which is connected to a wire 62 leading to one terminal of pump motor 31. The opposite terminal of pump motor 31 is connected to a wire 63 which leads to one terminal of solenoid unloader valve 25, the other terminal of which is connected to a wire 64 leading to a contact of thermostat 65, the temperature responsive element of which is connected to wire 66 leading back to the opposite terminal of battery 16. When thermostat 65 is closed in response to the demand of cooling in the car, current can flow through the wires 60, 62, 63, 64 and 66 to operate the fan motor 61, the pump motor 31 and the solenoid 25. Thus, whenever cooling is required the compressor will be placed in operating condition by reason of the opening of the solenoid valve 25, a constant stream of liquid will be drawn from the accumulator tank 28 by the pump 30, and air will be drawn through the cabinet 34 by the blower 33.

In order to differentiate between standby service and running service, a control circuit is provided as follows: Current may be drawn from battery 61 through wire 60 to wire 70, which is connected to one terminal of the valve motor 44. The opposite terminal of valve motor 44 is connected to wire 71 leading to a contact 72. Contact 72 is engageable by a spring blade switch 73 mounted upon an arm 74 pivoted at 75. The opposite end of arm 74 is connected to the slider of a centrifugal governor device 76 driven by a belt 77 passing around a pulley on the shaft of the compressor 23. The governor 76 is so adjusted that the switch 73 will make contact when the compressor is running at a speed slightly above the cut-in speed of the clutch 22, or at the same speed if desired. The spring blade 73 is connected to a wire 78 which leads back to the opposite terminal of battery 16 through wire 66. By means of this control circuit, it can be seen that valve motor 44 will be deenergized when the compressor is inoperative, which means that the valve 43 will be opened when the car is standing still or proceeding in either direction at slow speed, and the valve 43 will be closed when the car is proceeding in either direction above a certain minimum speed.

The operation of the foregoing mechanism is as follows: When the car is proceeding at a speed fast enough to cause the clutch 22 to engage and to cause the blade 73 to engage contact 72, the valve 43 will be closed causing any refrigerant passing through the coil 32 to pass through the fixed orifice 45. The pump 30 will be operated and the compressor will be loaded if the thermostat 65 is in engaging position due to a demand for cooling. This will cause a certain amount of refrigerant to be passed through coil 32 to do cooling and dehumidifying work upon the air, and after passing the coil 32, the refrigerant will again expand due to the orifice 45 acting as a fixed expansion valve. The refrigerant in coil 51 will be at a temperature lower than the refrigerant in coil 32, which lower temperature should preferably be 30° Fahrenheit or lower in order to cause the formation of ice in the tank 52. The expanded gas will pass through the top of the accumulator tank 28 into the pipe 55 leading back to the compressor. When the car is travelling at a slower speed, or is standing still, valve 43 will be open thereby causing any refrigerant passing through the system to follow the path of least resistance through branch 41. Since the centrifugal clutch 22 disengages at about the same time that spring blade 73 disengages, the compressor will not be operating and the refrigerant passing through coil 32 must be drawn from the accumulator tank 28. If thermostat 65 continues to call for cooling, the motor 31 will continue to operate pump 30 so that the same quantity of liquid refrigerant will pass from the accumulator 28, but since valve 43 is open the refrigerant will act merely as a medium for transferring heat from the air passing through coil 32 to the ice which has previously formed in tank 52, thereby causing the tank 52 to act as a condenser for refrigerant travelling from the accumulator through the pump, through the air cooling coil 32, through the coil 51 and back to the accumulator 28. Provision is thus made for utilizing the refrigerant compressor to form ice at a lower temperature than the temperature existing in coil 32 during the running of the compressor, and for utilizing the melting of the ice during standby operation of the system by pump 30.

Compressor 23 may be connected to a motor 80 provided with terminals 81 for connection to an outside source of current in order that the car may be pre-cooled, or cooled during long standing periods which would exhaust the limited ice supply in tank 52.

Fig. 2 shows a modified form of the invention in which the centrifugal device 76 is replaced by another form of switch operating device which is specifically responsive to the pressure of the gas in the discharge pipe 26, the functioning of the apparatus being otherwise identical since the discharge pressure is a reflection of the car speed. All other parts of the system remain the same and operate in the same manner, it being only necessary that wire 71 extend to spaced contacts 90 from one of which wire 78 will extend to wire 66 leading to the battery. The spaced contacts 90 may be bridged by a contact bar 91 operated by a flexible bellows 92 connected by a tube 93 to the discharge pipe connecting condenser 26 to the compressor 23. The valve 43 will thus be opened when the clutch 22 is disengaged during standing or slow speed operation of the train and will be closed as soon as the clutch engages and thermostat 65 causes the unloader valve 25 to cease functioning whereby the compressor may discharge compressed refrigerant. Another slight variance may be observed in that the standby compressor operating motor 80 is shown as connected to the compressor 23 through a clutch device 100, which may be manually operated or may be automatically engaged by any conventional over-running device in order that the motor armature will not be an additional load during the running of the compressor by the car axle.

Having described two forms of my present invention, it should be apparent to those skilled in the art that modification in arrangement and detail thereof may be devised. All such modifications as come within the scope of the following claim are considered a part of my invention.

I claim:

An air conditioning system for vehicles comprising a refrigerant compressor, mechanical means for driving the compressor by power derived from the motion of the vehicle, a condenser for liquefying the refrigerant compressed by the compressor, an accumulator for storing the condensed liquid, an air conditioning coil in which the liquid is expanded to cool the air in the vehicle, a constant speed pump for drawing a constant stream of liquid from the accumulator and discharging the same into said air conditioning coil, a source of current carried by the vehicle for operating said constant speed pump, an ice-forming coil through which the expanded refrigerant from said air conditioning coil is passed and from which said refrigerant is returned to said accumulator tank, two parallel passages through which refrigerant may pass from said air conditioning coil to said ice storage coil, a pressure-differential producing device in the first of said passages, a speed-responsive valve in the second of said passages, a suction pipe extending from said accumulator tank to the inlet of said compressor whereby gas may be returned for compression, thermostatic means for controlling the operation of said pump whereby said pump operates whenever cooling is desired in said vehicle, and speed-responsive means for causing said speed-responsive valve to close said second parallel passage during the running operation of the vehicle in order to cause refrigerant compressed by said compressor first to pass through said air conditioning coil then to pass through said pressure-differential producing device whereby to cause the formation of ice on said ice-forming coil, and for causing said speed-responsive valve to open said second parallel passage during standby operation whereby to cause the cooling of refrigerant circulated by said pump from said accumulator tank through said air conditioning coil and said ice-forming coil by melting the ice surrounding said ice-forming coil.

CHARLES R. NEESON.